US005881420A

United States Patent [19]

Bruckelmyer

[11] Patent Number: 5,881,420

[45] Date of Patent: Mar. 16, 1999

[54] CHIMNEY CLAMP AND SEAL

[76] Inventor: Mark Bruckelmyer, 5617 McQuade Rd., Duluth, Minn. 55804

[21] Appl. No.: 752,222

[22] Filed: Nov. 19, 1996

[51] Int. Cl.[6] .................................. F23J 3/00; B66F 3/08; F16L 1/26

[52] U.S. Cl. .................................. 15/104.066; 15/249.1; 254/126; 138/89; 277/323; 220/235; 166/192

[58] Field of Search .............................. 15/249.1, 249.2, 15/249.3, 104.066, 104.067, 104.068, 104.069, 104.2; 254/126; 138/89; 277/323, 328; 220/235, 236; 405/42; 166/192

[56] References Cited

U.S. PATENT DOCUMENTS

| | | | |
|---|---|---|---|
| 76,330 | 4/1868 | Kerr et al. | 269/48.1 |
| 172,347 | 1/1876 | Shedlock | 254/40 |
| 567,658 | 9/1896 | Rose | 82/169 |
| 725,874 | 4/1903 | Riley | 269/48.1 |
| 1,066,688 | 7/1913 | Welsh et al. | 15/104.067 |
| 1,464,249 | 8/1923 | Gramowski | 15/104.067 |
| 1,709,746 | 4/1929 | Schwerin | 254/126 |
| 1,770,436 | 7/1930 | Shinn | 15/104.067 |
| 1,786,305 | 12/1930 | James | 254/126 |
| 2,615,413 | 10/1952 | Adams et al. | 269/48.1 |
| 3,030,903 | 4/1962 | Morris | 269/48.1 |
| 3,550,636 | 12/1970 | Hearne | 138/89 |
| 4,285,368 | 8/1981 | Terrill et al. | 138/89 |
| 4,538,317 | 9/1985 | Sorensen | 15/104.067 |
| 5,029,614 | 7/1991 | Lara et al. | 138/89 |
| 5,201,345 | 4/1993 | Meskanick et al. | 138/89 |
| 5,263,515 | 11/1993 | Goodale | 138/89 |
| 5,659,917 | 8/1997 | Kotary | 15/104.069 |

FOREIGN PATENT DOCUMENTS

| | | | |
|---|---|---|---|
| 22072 | of 1906 | United Kingdom | 15/104.066 |

*Primary Examiner*—Gary K. Graham
*Attorney, Agent, or Firm*—Palmatier, Sjoquist, Voigt & Christensen, P.A.

[57] ABSTRACT

A tool for clamping against the interior of a chimney flue having a scissors jack mechanism for adjustably clamping into various size chimneys. A seal plate for sliding over the shaft of the clamping device and for tightly sealing against the interior chimney flue walls. A cleaning brush mechanism affixed to the end of a tubular member, sized to slide over the clamping shaft for cleaning the interior of a chimney.

10 Claims, 3 Drawing Sheets

CHIMNEY CLAMP AND SEAL

BACKGROUND OF THE INVENTION

The present invention relates to a tool for cleaning and repairing chimneys; more specifically, the invention relates to a tool which provides access and a grasping mechanism for the inside of a chimney. The tool has utility and advantage for both cleaning the chimney interior and for replacing defective sections of chimney construction.

In the field of chimney cleaning it is typical to use a brush-like head attached to the end of a long handle; frequently the handle is assemblable in sections to permit access to the interior of a chimney from the exterior roof of a building. The chimney is cleaned by moving the brush-like head up and down inside the chimney, thereby permitting accumulations of dirt and other matter which cling to the chimney interior to fall through the bottom of the chimney. Naturally, precautions must be taken to provide a collection receptacle beneath the bottom of the chimney opening to collect the falling dirt and particulate matter to facilitate the clean-up process. Frequently, in a chimney above a fireplace opening it is necessary to seal the entire fireplace opening during the cleaning process in order to prevent dirt and dust from entering the room of the fireplace opening. Examples of chimney cleaning devices can be found with reference to U.S. Pat. Nos. 4,538,317, issued Sep. 3, 1985; 1,770,436, issued Jul. 30, 1930; 1,464,249, issued Aug. 7, 1923; and 1,066,688, issued Jul. 8, 1913.

In the field of chimney construction and repair, it is typical that chimneys are constructed with interior flues having sections stacked one atop another. Such flues may be made from cylindrical metallic sections or from rectangular masonry sections. In all cases, the lowermost section is supported above the firebox and additional sections are stacked vertically to the top of the chimney. If any particular section becomes corroded, cracked or damaged, the section may be replaced by first removing all sections above it, access being had from the top of the chimney, and then removing and replacing the defective section. The previously removed sections may then be replaced in their relative stacked positions to complete the repair job.

In both the foregoing circumstances it is desirable to utilize a tool which is capable of insertion downwardly through the top end opening of the chimney to permit convenient access into the chimney interior. It is necessary that the tool be capable of being lowered downwardly through the entire length of the chimney and that it be conveniently removable from the top of the chimney opening.

SUMMARY OF THE INVENTION

The present invention comprises an adjustable screw clamping device arranged at the end of a pole handle section, wherein the turning of the handle will turn the screw and adjustably position two outwardly facing pads by either bringing them closer together or spacing them farther apart. The pole handle section has an upper end which is attachable to a further pole handle section, which is similarly constructed for attachment to still further pole handle sections. A flexible insert which is shaped to snugly conform to the interior cross-section of the chimney is positioned adjacent the screw clamping device and is insertable and retractable with the screw clamping device. A cleaning brush is affixed at the end of a hollow tubular handle section, wherein the interior diameter of the tubular handle section is larger than the size of the pole handle section. The hollow tubular handle section has an upper end which is attachable to further tubular handle sections, and all of the tubular handle sections are concentrically mounted about and slidably positionable relative to the pole handle sections.

It is a principal object and advantage of the invention to provide a tool for cleaning the inside of a chimney flue and for clamping against the interior walls of a chimney flue.

It is a further object and advantage of the invention to provide a tool for cleaning the inside of a chimney flue and for collecting dirt and debris which might fall as a result of the cleaning process.

Other objects and advantages of the invention will become apparent from the following specification and claims, and with reference to the appended drawings.

DESCRIPTION OF THE PREFERRED EMBODIMENT

Figure 1:
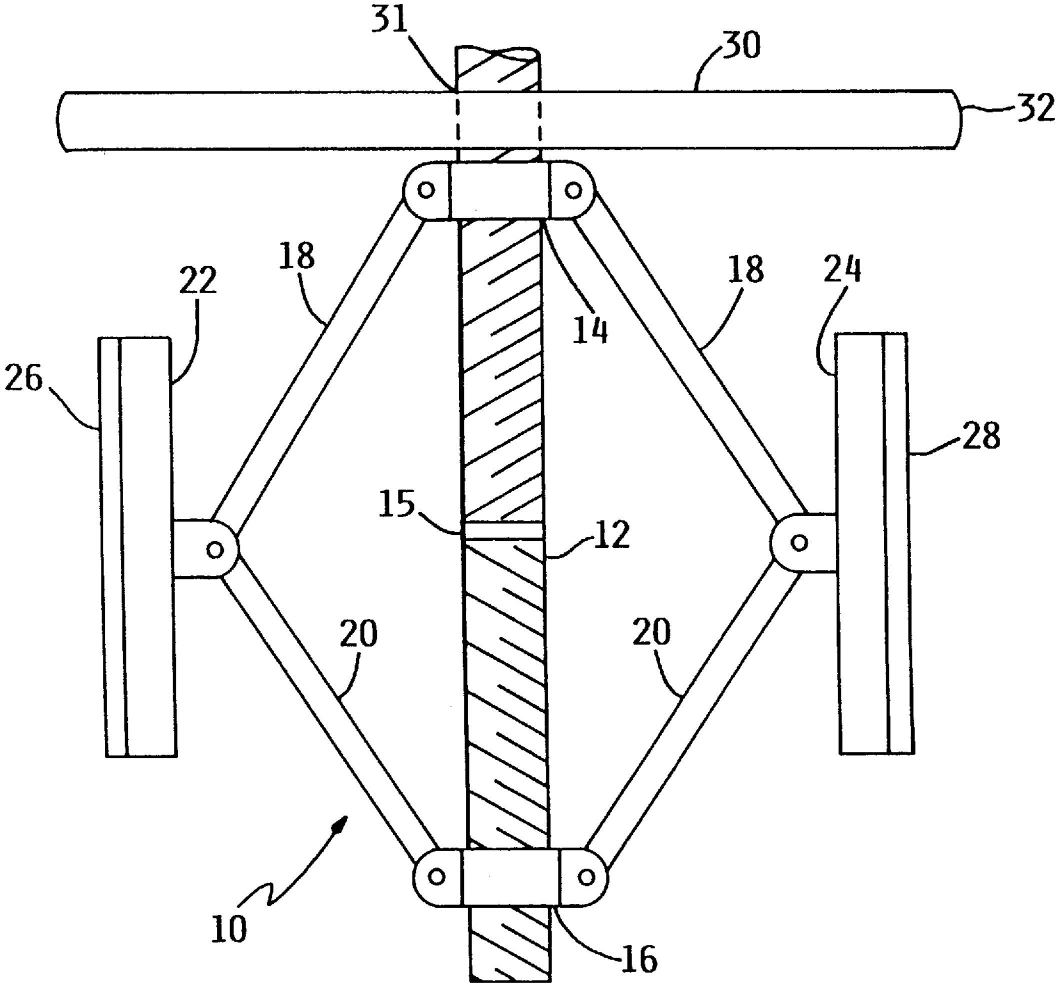
FIG. 1 shows an elevation view of a part of the invention.

Referring to the figures, the invention includes a screw jack assembly 10, including a threaded shaft 12 having two threaded collars 14, 16 engaging the threaded shaft, such that rotation of the shaft causes the collars 14, 16 to move upwardly and downwardly, always in opposite directions. The shaft 12 is threaded in opposite helical directions above and below center band 15, and each collar 14, 16 is engageable to its respective threaded portion of shaft 12. A sufficient length of shaft is threaded as described above to permit the scissors mechanism to fully open and close. A pair of scissors arms 18 is pivotally connected to collar 14 at respective upper ends, and pivotally connected to pads 22, 24 at respective lower ends. A pair of scissors arms 20 is pivotally connected to collar 16 at respective lower ends, and pivotally connected to pads 22, 24 at respective upper ends. A resilient layer 26 made from material such as rubber is adhered to the outer surface of pad 22, and a similar resilient layer 28 is adhered to the outer surface of pad 24.

A seal plate 30 having a central opening 31 is loosely fitted over shaft 12 so that plate 30 may be slidably positioned along shaft 12. Seal plate 30 preferably has an outer circumference 32 of resilient material such as rubber. Seal plate 30 is sized and shaped to snugly fit into a chimney flue. Since chimney flues are available in a number of different rectangular and circular sizes, it is contemplated that a number of different seal plates 30 will be available as a part of the invention to accommodate these different flue sizes.

Figure 2:
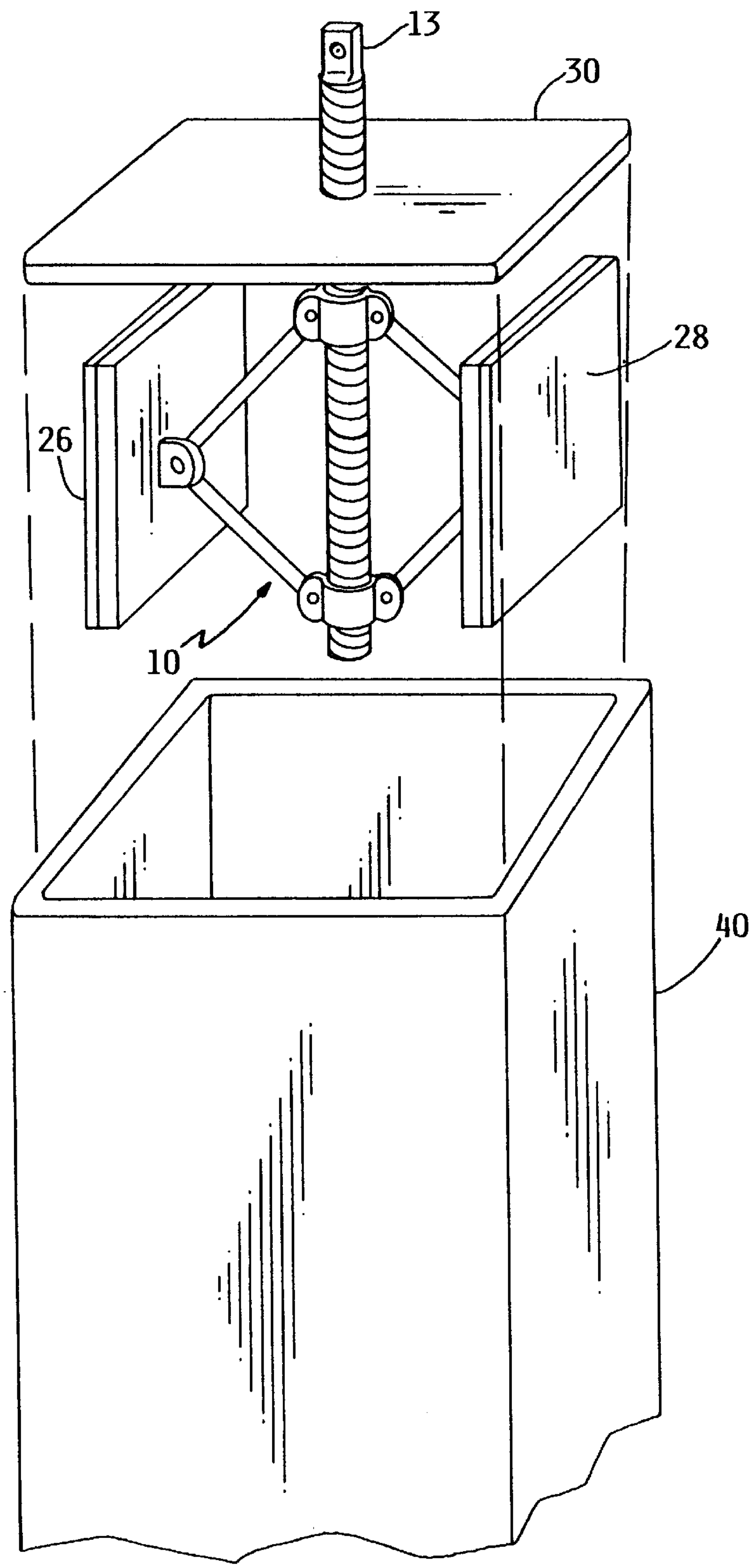
FIG. 2 shows an isometric view of one part of the invention positioned in alignment with a chimney opening.

FIG. 2 shows an isometric view of the invention positioned in alignment with a chimney 40 opening. In this position the scissors jack mechanism is adjusted to retract pads 26, 28 inwardly to permit the apparatus to be inserted into the chimney 40 opening. In operation, the invention is first inserted into the chimney 40 opening, wherein the scissors jack mechanism 10 is lowered into the chimney opening to a position near the bottom of the chimney, or to a level in the chimney where repairs or work are to be performed. Next, the shaft 12 is turned until the scissors jack mechanism 10 is outwardly expanded wherein the pads 26, 28 are clamped against the interior chimney walls to hold the apparatus in a fixed position. It is contemplated that shaft 12 has an upper end 13 with a coupler suitable for attachment to extension shaft sections, so that the apparatus may be lowered any reasonable distance into the chimney.

Figure 3:
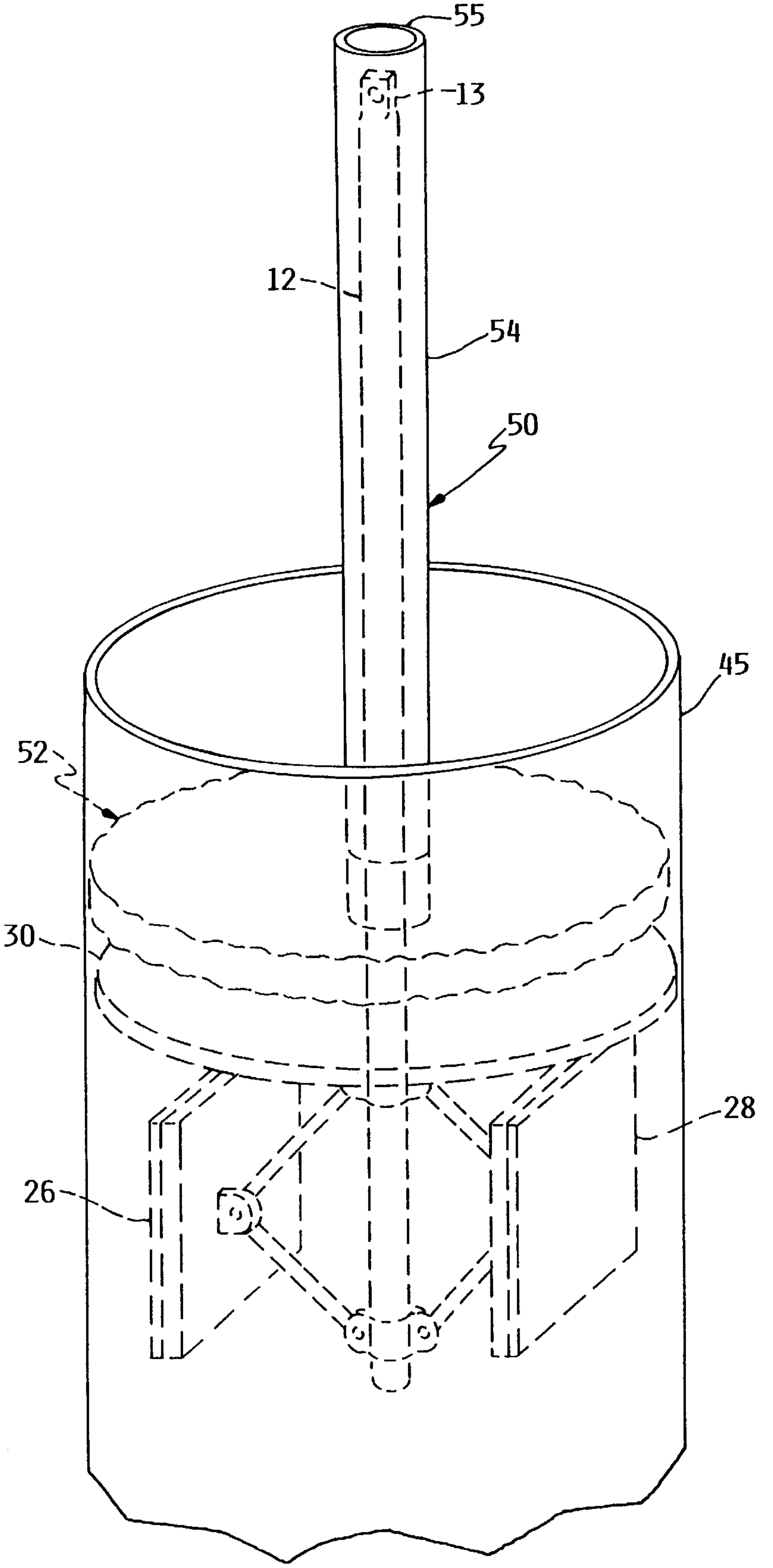
FIG. 3 shows an isometric view of the invention inserted within a chimney flue.

FIG. 3 shows an isometric view of the invention inserted into a round chimney flue 45 and including a chimney cleaner 50 also inserted into the flue 45. The chimney cleaner 50 comprises a bristle or brush head 52 mounted to a tubular extension 54. Tubular extension 54 has an inner diameter larger than the diameter of shaft 12 to permit extension 54 and bristle head 52 to be moved upwardly and downwardly relative to shaft 12. It is contemplated that the upper end 55 of tubular extension 54 is fitted with a coupler attachment to permit connection with further tubular extensions. In operation, the screw jack mechanism is lowered into chimney flue 40 to a sufficient depth and the shaft is turned to clamp the pads 26, 28 against the interior chimney flue 40 wall. Next, the seal plate 30 is fitted over shaft 12 and is inserted into chimney flue 40. The tubular extension 54 and bristle head 52 are fitted over shaft 12 and are lowered into chimney flue 40, pushing seal plate 30 ahead of it along shaft 12 until seal plate 30 contacts the upper end of scissors jack mechanism 10. Extension sections may be attached to shaft 12 and tubular extension 54 as necessary to reach the lowest level of the chimney where work is to be performed. Tubular extension 54 and bristle head 52 are moved upwardly and downwardly to permit the bristles on bristle head 52 to thoroughly clean the interior surface of chimney flue 45. As the cleaning process continues, particles of dirt and other residue will fall from the interior surface of chimney flue 45 and will drop downwardly onto the top surface of seal plate 30. After the cleaning process has been completed the extension(s) 54 may be removed from within the chimney flue 45 and the bristle head 52 may be removed. The scissors jack mechanism 10 may then be loosened slightly so that the scissors jack mechanism and seal plate 30 may be lifted from within the chimney flue.

In the event the operation to be performed is a flue section replacement, the only part of the invention which is necessary is the scissors jack mechanism and the seal plate. In this case, the flue sections are removed through the top of the chimney in sections until the defective section can be removed by clamping the scissors jack mechanism against each flue section in sequence and removing the sections sequentially. A new section may be inserted into the chimney in the same manner, and the chimney sections above the replaced section may be reinserted into the chimney.

One very typical operation in which the invention finds particular utility is in the repair of the upper portions of a chimney. The most frequently needed repairs on chimneys usually occurs at or near the very top end of a chimney, wherein masonry may have broken free or the chimney liner may develop cracks or other deterioration may have occurred. In this case, the scissors jack mechanism and seal plate may be lowered into the chimney interior a short distance and the screw may be turned to cause the scissors jack to tightly clamp against the interior of the chimney. As masonry or other work is performed, any materials which fall downwardly into the chimney interior will be captured when they make contact with the seal plate. After all the repairs have been completed, the scissors jack may be loosened sufficiently to permit the seal plate and scissors jack to be retrieved from the chimney interior, also retrieving all of the material which has fallen into the chimney. This application allows the invention to be used as a debris catcher and eliminates the damage and inconvenience which would otherwise be caused by pieces of masonry or other material falling completely downwardly to the chimney damper or fire box.

The present invention may be embodied in other specific forms without departing from the spirit or essential attributes thereof; and it is, therefore, desired that the present embodiment be considered in all respects as illustrative and not restrictive, reference being made to the appended claims rather than to the foregoing description to indicate the scope of the invention.

What is claimed is:

1. A chimney cleaning tool, comprising:

a) a shaft having a lower end with respective adjacent portions threaded in opposite helical thread directions and having an upper end with a coupler with means for attachment to a further shaft;

b) a threaded collar engaged with each of the respective threaded adjacent portions of said shaft, each collar having a pair of scissors arms attached thereto;

c) a pair of pads, each pad pivotally connected to a scissors arm from each of said collars; and d) a tubular extension received on said shaft, said extension having an interior opening larger than said shaft and having a first end with a bristle cleaning head.

2. The apparatus of claim 1, wherein each of said pads further comprises an outwardly facing resilient layer.

3. The apparatus of claim 2, wherein said outwardly facing resilient layer further comprises a rubber layer.

4. The apparatus of claim 1, further comprising a seal plate received on said shaft and having a central opening larger than said shaft and having a resilient outer periphery.

5. A tool for accessing a chimney interior, comprising an elongate shaft having a first end, a scissors jack mechanism attached at said first end, said scissors jack mechanism operable by respectively oppositely turned threads proximate said first end of said shaft, said scissors jack mechanism comprising a pair of threaded collars respectively engaging said oppositely turned threads and pivotally connected by scissors arms to a pair of pads, each of said pads having pivotal connection to a scissors arm connected to each of said collars; a seal plate received on said elongate shaft and having a central opening larger than said shaft, and having an outer periphery sized to snugly fit into said chimney interior; whereby turning of said shaft causes said collars to travel in respective opposite directions along said shaft, and said pads move in respective opposite directions relative to said shaft.

6. The apparatus of claim 5, further comprising a tubular extension sized to loosely fit over said shaft, said tubular extension having a bristle portion projecting outwardly proximate one end.

7. A chimney tool comprising:

a) a shaft having a lower threaded end and a pair of threaded collars engaged with said lower threaded end;

b) a pair of scissors arms attached to each of said threaded collars at respective scissors arms ends, each of said pair of scissors arms having an intermediate hinge connection to a scissors arm attached to the other of said threaded collars;

c) a pair of pads, each pad having a pivotal connection to an intermediate hinge connection; and d) a seal plate received on said shaft and having a center opening sized larger than said shaft, whereby said seal plate may be slidably moved along said shaft with said shaft in said center opening.

8. The apparatus of claim 7, wherein said pads further comprise an outer surface area of resilient material.

9. The apparatus of claim 8, wherein said seal plate further comprises a peripheral edge of resilient material.

10. The apparatus of claim 9, wherein said resilient material further comprises a rubber material.

* * * * *